United States Patent
Watanabe et al.

[11] 3,794,445
[45] Feb. 26, 1974

[54] WATER TURBINE RUNNER

[75] Inventors: Kiyoshi Watanabe; Kazuei Saito; Tadaaki Kobayashi, all of Hitachi, Japan

[73] Assignee: Hitachi, Ltd., Tokyo, Japan

[22] Filed: Apr. 28, 1972

[21] Appl. No.: 248,681

Related U.S. Application Data

[63] Continuation-in-part of Ser. No. 84,524, Oct. 27, 1970, abandoned.

[30] Foreign Application Priority Data
Oct. 31, 1969 Japan.................................. 44-86833

[52] U.S. Cl. ................................................ 416/241
[51] Int. Cl............................................... F01d 5/28
[58] Field of Search ............ 416/186, 213, 241, 224

[56] References Cited
UNITED STATES PATENTS

| | | | |
|---|---|---|---|
| 1,150,113 | 8/1915 | Haynes ............................ | 75/126 H |
| 1,357,549 | 11/1920 | Fahrenwald ...................... | 75/126 H |
| 2,201,425 | 5/1940 | Berglund........................... | 75/126 H |
| 2,272,534 | 2/1942 | Trantlin............................. | 75/126 H |
| 2,624,671 | 1/1953 | Binder et al. ...................... | 75/126 H |
| 3,293,030 | 12/1966 | Child et al. ................... | 416/224 UX |
| 3,561,886 | 2/1971 | Kreischer et al.................. | 416/224 |
| 3,564,689 | 2/1971 | Hirtenlechner.................... | 416/224 |
| 3,650,845 | 3/1972 | Oda et al. ..................... | 416/241 UX |
| 3,661,658 | 5/1972 | Oda et al. ..................... | 416/213 UX |

FOREIGN PATENTS OR APPLICATIONS

| 728,972 | 4/1955 | Great Britain..................... | 416/224 |
|---|---|---|---|

Primary Examiner—Everette A. Powell, Jr.
Attorney, Agent, or Firm—Craig and Antonelli

[57] ABSTRACT

A water turbine runner comprising a plurality of blades coaxially fixed to one axis each of said blades is composed of an iron-based material, wherein each blade is provided with a smooth surface weld metal on the surface where erosion due to cavitation liable to take place, said weld metal being made of an erosion-resistant metal consisting essentially of up to 0.5 wt% of C, 10 to 30 wt% of Cr, 0.5 to 30 wt% of Co, up to 1 wt% of Si, up to 3 wt% of Mn, and the balance of Fe.

21 Claims, 1 Drawing Figure

PATENTED FEB 26 1974 3,794,445
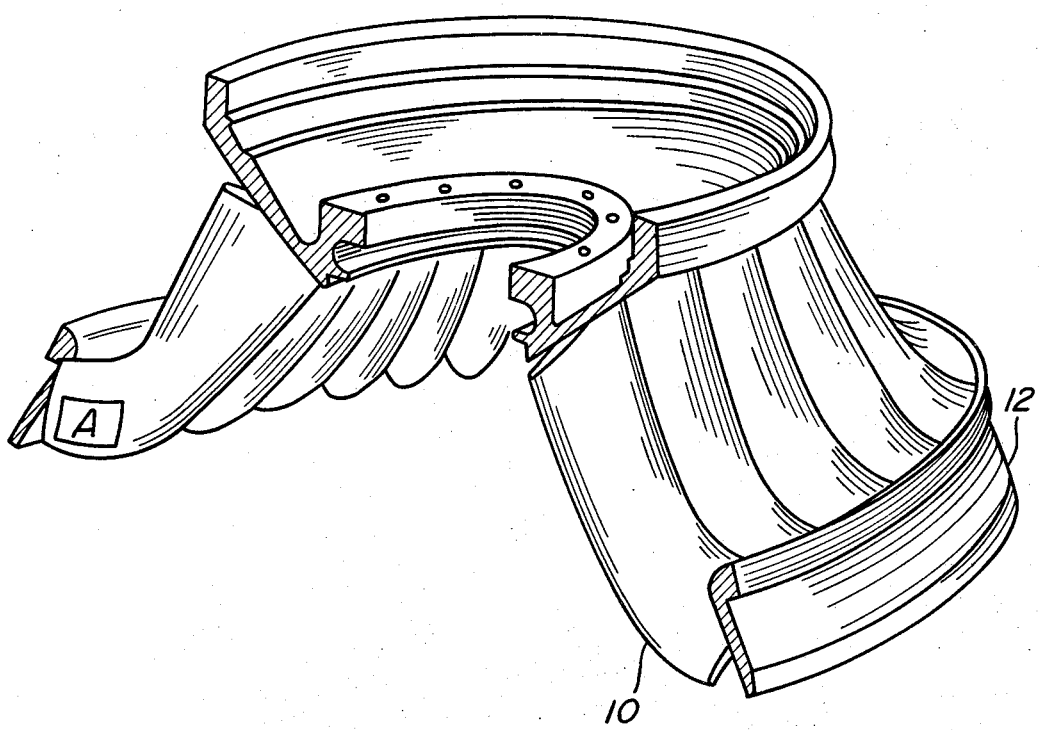

WATER TURBINE RUNNER

CROSS-REFERENCE TO THE RELATED APPLICATION

This is a continuation-in-part application of the U.S. Ser. No. 84,524 filed on Oct. 27, 1970 now abandoned.

BACKGROUND OF THE INVENTION

1. Field of the Invention

This invention relates to a novel water turbine runner of which each blade is provided with on the surface which is liable to undergo erosion due to cavitation a weldmetal high in resistance to erosion.

2. Description of the Prior Art

A water turbine runner has a plurality of blades coaxially fixed to one axis with which high speed water collides to rotate the runner.

It is necessary that the runner is composed of a material capable of withstanding the power of rotation. Further, at the time when the operation of a water turbine runner is discontinued, a power of counteraction is applied thereto, so that the runner should be composed of a material capable of withstanding the power of counteraction. For the above reasons, a water turbine runner material should have a yield strength of at least 50 kg/mm$^2$, an elongation of at least 20% and an impact of at least 6 kg-m/cm$^2$, in general. Further, a water turbine runner undergoes corrosion due to contact with high speed water, so that the runner material is required to have good resistance to corrosion as well.

It is well known that a steel containing about 13 wt% of chromium which has a tempered martensite structure satisfies the conditions required for water runner material, and has been applied to many runners. However, the above-mentioned steel has had such drawback that when a runner composed of said steel is put in motion the surface of each blade opposite to the surface, with which high speed water collides at substantially a right angle, is brought to a state low in pressure and causes cavitation-erosion due to impact action of the water. It has therefore been an ordinary practice that in most cases, a material high in resistance to cavitation-erosion is welded to portions eroded by cavitation. As the welding material, a steel containing about 18 wt% of chromium and about 8 wt% of nickel has been used in most cases in consideration of the affinity for the runner material. The above welding material, however, is not sufficiently been satisfactory in resistance to cavitation-erosion.

In order to inhibit the cavitation-erosion, a material high in hardness may be used so that the runner manufactured can withstand the impact action of water. In this sense, a cobalt alloy called sterite is most preferable, there were some cases where the sterite was actually used. However, a weldmetal of sterite has such a structure that an eutectic structure composed of a cobalt solid solution containing tungsten and chromium and a cobalt-tungsten double carbide fills the boundaries between grains of said solid solution and dendrite, and has such drawback that cracks are formed at portions where said eutectic carbide is present.

SUMMARY OF THE INVENTION

OBJECTS OF THE INVENTION

A principal object of the present invention is to provide a novel water turbine runner blade which is liable to undergo erosion due to cavitation provided with formed a weldmetal high in resistance to cavitation-erosion and free of occurrence of welding cracks.

Another object of the invention is to provide a water turbine runner provided with blades which are cavitation-erosion resistant as excellent as that of sterite.

DESCRIPTION OF THE INVENTION

The water turbine runner of the present invention comprises a plurality of blades coaxially fixed to one axis wherein the blades are composed of an iron-base material, each of the blades which is liable to undergo erosion due to cavitation being provided with a smoothed-surface weld-metal of an erosion-resistance the weldmetal consisting essentially of up to 0.5 wt% of C, 10 to 30 wt% of Cr, 0.5 to 30 wt% of Co, up to 1 wt% of Si, up to 3 wt% of Mn, and the balance of Fe.

A weldmetal formed on the surface of each blade of a runner is desirably such that it is not only high in harness but also is work-hardened when high speed water violently collides therewith during the operation of the runner. In this respect, a weldmetal of the above-mentioned composition is preferable.

The runner material may be any material so far as it has a yield strength of at least 50 kg/mm$^2$, an elongation of at least 20% and an impact of at least 6 kg-m/cm$^2$, and thus includes substantially all of iron-based materials. More preferably, however, it is necessary to use a material which itself is high in resistance to cavitation-erosion and which shows an erosion amount of less than 200 mg/2 hr in a magnetostriction type erosion test, e.g. a steel containing 11 to 14 wt% of chromium is preferable.

Among the elements constituting the weldmetal, Co is the most important element. That is, due to the presence of Co, the weldmetal can be work-hardened and prevented from weld-cracking. The action of Co for the prevention of weld-cracking is such that S, which segregate to the boundary of grains at the time of coagulation of weldmetal to become a cause for the cracking, can be fixed as CoS prior to the coagulation and removed as a slag.

The composition ranges of the weldmetal have been decied on the basis of many experimental results and are grounded on the following facts:

C: The presence of C is necessary to increase the hardness of the weldmetal and to enhance the weldmetal in resistance to cavitation-erosion. On the other hand, however, C promotes the formation of eutectic carbide to bring about a cause for weld-cracking. Accordingly, the amount of C is preferably up to 0.5 wt%, more preferably from 0.15 to 0.45 wt%.

Cr: The presence of Cr increases the mechanical strength and corrosion resistance of the weldmetal. This effect is clearly observed when the amount of Cr is more than 10 wt%. It has been confirmed that if the amount of Cr is up to 10 wt%, weld cracks are formed at high temperatures. The larger the amount of Cr, the greater the strength of the weldmetal. If the amount of Cr is excessively large, however, the weldmetal is degraded in ductility to finally bring about cold-cracking. It has thus been found that the upper limit of Cr is 30 wt%.

Co: The presence of Co is effective for enhancing the weldmetal in resistance to cavitation-erosion and in prevention of weld-cracking. This effect is clearly observed when the amount of Co is more than 0.5 wt%. However, a saturation is attained when the amount of Co is 30 wt%. For economical reason, therefore, the upper limit of Co is 30 wt%.

Si: Si has effects of deoxidizing the weldmetal and inhibiting the migration of impurities into the weldmetal. However, the presence of Si promotes weld-cracking, so that the amount thereof should not exceed 1 wt%.

Mn: Mn gives the same effects as those of Si. If the amount of Mn is excessively large, however, crystal grains are made coarse to degrade the weldmetal in ductility. Accordingly, the amount of Mn should not exceed 3 wt%.

In the weldmetal, P and S are contained as inevitable impurities. These elements not only greatly promote weld-cracking but also bring about degradation in ductility of the weldmetal. Accordingly, the amounts of said elements should be limited to amounts as small as possible. According to experiments carried out by the present inventors, it has been found that in order to obtain a weldmetal high in reliability, the amount of each of P and S should be less than 0.03 wt%.

In many studies, the present inventors have confirmed that a weldmetal containing Cr and Co in a total amount of 26 wt% or more is far less in degree of erosion than that containing said elements in a total amount of less than 26 wt%, and that a weldmetal is more lowered in degree of erosion with increasing amount of Cu hich is additionally incorporated therein. The reason why a weld-metal is improved in cavitation-erosion resistance is ascribable to the fact that Cu dissolves in the matrix to bring about the enhancement in corrosion resistance of the weldmetal, with the result that the weldmetal is improved in erosion resistance accordingly. The effect of Cu is observed when it is used in an amount of 1 wt% or more. Since Cu greatly promotes weld-cracking, however, the upper limit of Cu is 8 wt%. The inventors have further confirmed that a weldmetal containing Cu and Co in a total amount of 6 wt% or more is far lower in degree of erosion than that containing said elements in a total amount of less than 6 wt%.

A weldmetal, welded onto the surfaces of portions of a water turbine runner which are liable to undergo cavitation-erosion ought to be made smooth on the surface by processing the surface of the weldmetal after welding. In the welding, the welded surface should be processed so that the thickness of the weldmetal becomes 3 to 7 mm. In case the thickness of the weldmetal is less than 3 mm, the weldmetal is undesirably migrated with elements from the runner material to make it impossible to attain the desired composition. The adoption of a thickness of more than 7 mm, is uneconomical.

A water turbine runner undergoes cavitation-erosion at various portions, through the portions vary depending on the kind of the runner. A Pelton type water turbine runner undergoes cavitation-erosion at portions where the pressure becomes low due to the flow of high speed water when the portions are deformed by collision of the high speed water. A Francis and Capran type water turbine runners undergo cavitation-erosion at opposite sides of portions with which high speed water collides. Accordingly, each of the above-mentioned water turbine runners should be welded with the aforesaid weldmetal at least on the surfaces of said portions.

BRIEF DESCRIPTION OF THE DRAWING

FIG. 1 is a perspective, partially broken away, view of a Francis type water mill runner embodying the present invention.

EXAMPLES

EXAMPLE 1

25 Kinds of weldmetal having the compositions shown in Table 1 were individually formed on the surface of a steel plate composed of 0.20 wt% of C, 0.35 wt% of Si, 0.50 wt% of Mn, 0.021 wt% of P, 0.016 wt% of S, and the balance of Fe. At the time of preparation of each welding rod used, the amount of each of P and S had been so controlled as to become less than 0.01 wt%. The welding rod was prepared by coating a flux on a core wire of 4 mm in diameter so that the resulting welding rod came to have a diameter of 6.25 mm. The welding was carried out under the same conditions as in the case where the welding rod is actually welded to a water turbine runner. Concretely, the welding was conducted by the use of an alternating current welding machine, wherein the welding current was 130 to 150A and the temperature between strata was 150° to 200° C. In order to take up a sample from the resulting weldmetal, the thickness of the weldmetal was made 15 mm. The flux used had been composed of 28 wt% of $CaCO_3$, 6 wt% of CaFe, 45 wt% of rutile, 2 wt% of mica, 3 wt% of Mn, 5 wt% of Fe-Ti, 1 wt% of $K_2TiO_3$, and the balance of $Na_2SiO_3$.

TABLE 1

| No. | Composition (wt %) | | | | | | | |
|---|---|---|---|---|---|---|---|---|
|  | C | Cr | Co | Si | Mn | W | Ni | Fe |
| 1 | 0.13 | 9.4 | 12.9 | 0.21 | 0.37 | | | Balance. |
| 2 | 0.14 | 10.2 | 10.5 | 0.21 | 0.40 | | | Do. |
| 3 | 0.15 | 11.9 | 12.5 | 0.19 | 0.41 | | | Do. |
| 4 | 0.13 | 12.1 | 13.2 | 0.17 | 0.36 | | | Do. |
| 5 | 0.41 | 13.0 | 13.1 | 0.23 | 0.42 | | | Do. |
| 6 | 0.22 | 13.5 | 8.1 | 0.19 | 0.44 | | | Do. |
| 7 | 0.21 | 14.6 | 11.4 | 0.20 | 0.36 | | | Do. |
| 8 | 0.16 | 16.3 | 9.0 | 0.21 | 0.36 | | | Do. |
| 9 | 0.14 | 17.6 | 8.2 | 0.26 | 0.45 | | | Do. |
| 10 | 0.20 | 17.6 | 12.4 | 0.25 | 0.38 | | | Do. |
| 11 | 0.27 | 18.1 | 12.6 | 0.18 | 0.41 | | | Do. |
| 12 | 0.24 | 20.1 | 6.0 | 0.20 | 0.43 | | | Do. |
| 13 | 0.22 | 21.8 | 5.1 | 0.20 | 0.39 | | | Do. |
| 14 | 0.24 | 23.5 | 20.7 | 0.22 | 0.37 | | | Do. |
| 15 | 0.24 | 25.2 | 24.8 | 0.19 | 0.36 | | | Do. |
| 16 | 0.20 | 26.7 | 32.8 | 0.23 | 0.35 | | | Do. |
| 17 | 0.43 | 26.8 | 20.2 | 0.20 | 0.36 | | | Do. |
| 18 | 0.20 | 28.0 | 22.1 | 0.18 | 0.36 | | | Do. |
| 19 | 0.19 | 29.6 | 28.4 | 0.18 | 0.40 | | | Do. |
| 20 | 0.40 | 29.8 | 0.8 | 0.20 | 0.37 | | | Do. |
| 21 | 0.31 | 31.8 | 28.4 | 0.25 | 0.36 | | | Do. |
| 22 | 1.02 | 31.2 | Balance | 0.20 | 0.38 | 4.5 | | 2.2. |
| 23 | 0.06 | 17.7 | | 0.31 | 0.60 | | 6.92 | Balance. |
| 24 | 0.08 | 18.5 | | 0.58 | 0.77 | | 8.15 | Do. |

Cracks were observed in the weldmetal Nos. 1 and 21, but no cracks were observed at all in the weldmetal Nos. 2 to 20. The crack ratio of each of the weldmetal Nos. 1 and 21 was about 20% as measured according to the Y type weld-cracking test regulated in JIS Z 3158. The stellite weldmetal No. 22 formed many fine cracks, and the crack ratio thereof according to the Y type weld-cracking test was 100%.

Subsequently, an erosion test sample of 22 mm in diameter and 10 mm in length was taken up from each weld-metal, attached to a magnetostriction vibration type erosion test apparatus and subjected 4 times to erosion test for 30 minutes under such conditions as shown in Table 2.

TABLE 2
Erosion test conditions

| | |
|---|---|
| Frequency (KHz) | 6.5 |
| Amplitude (μ) | 120 |
| Test liquid | Drinking water |
| Test temperature (°C) | 25 |
| State of test liquid | Stationary |
| Test time (hr) | 2 |

In table 3 are totalled the amounts of eroded portions measured every 30 minutes.

TABLE 3

| Weldmetal No | 1 | 2 | 3 | 4 | 5 | 6 | 7 | 8 | 9 | 10 | 11 | 12 |
|---|---|---|---|---|---|---|---|---|---|---|---|---|
| Amount of eroded portions (mg/2 hr) | 14.1 | 12.0 | 10.0 | 9.0 | 3.3 | 11.2 | 6.8 | 8.8 | 7.8 | 5.1 | 3.2 | 7.0 |
| Weldmetal No | 13 | 14 | 15 | 16 | 17 | 18 | 19 | 20 | 21 | 22 | 23 | 24 |
| Amount of eroded portions (mg/2 hr) | 6.5 | 3.5 | 3.2 | 2.05 | 2.1 | 2.5 | 2.0 | 5.2 | 2.0 | 2.0 | 26.7 | 82.5 |

| No. | C | Cr | Co | Cu | Si | Mn | Fe |
|---|---|---|---|---|---|---|---|
| 34 | 0.19 | 18.1 | 1.6 | 3.3 | 0.31 | 0.50 | Do. |
| 35 | 0.40 | 18.2 | 2.2 | 5.6 | 0.28 | 1.12 | Do. |
| 36 | 0.13 | 18.4 | 5.8 | 2.1 | 0.19 | 1.40 | Do. |
| 37 | 0.24 | 20.1 | 6.0 | 1.8 | 0.20 | 1.05 | Do. |
| 38 | 0.20 | 21.3 | 0.8 | 4.5 | 0.22 | 0.77 | Do. |
| 39 | 0.21 | 24.6 | 5.7 | 2.9 | 0.29 | 0.63 | Do. |

In the weldmetal No. 33, fine cracks were partly observed. This is ascribable to the excessive amount of Cu. No cracks were observed in all other weldmetals than the weldmetal No. 33.

Subsequently, an erosion test sample of 22 mm in diameter and 10 mm in length was taken up from each weld-metal, attached to a magnetostriction vibration type erosion test apparatus, and subjected 4 times to erosion test for 30 minutes under the same conditions as in Example 1.

In Table 5 are totalled the amounts of eroded portions measured every 30 minutes.

TABLE 5

| Weldmetal No | 25 | 26 | 27 | 28 | 29 | 30 | 31 | 32 | 33 | 34 | 35 | 36 | 37 | 28 | 39 |
|---|---|---|---|---|---|---|---|---|---|---|---|---|---|---|---|
| Amount of eroded portions (mg/2 hr) | 3.9 | 4.3 | 8.9 | 4.8 | 8.6 | 6.4 | 5.1 | 4.8 | 5.2 | 7.5 | 5.8 | 5.9 | 6.1 | 7.3 | 4.8 |

It it well known that a stellite weldmetal is minimum in amount of eroded portion. The same result was obtained in the above-mentioned test as well. Among the weldmetals according to the present invention, however, those which are larger in amounts of Cr and Co are substantially equivalent in cavitation-erosion resistance to stellite. The weldmetal No. 24 of a steel containing about 8 wt% of Ni and about 18 wt% of Cr, and the weldmetal No. 23 which is somewhat different in composition from the said weldmetal but has a stable austenite structure, like said weldmetal, are markedly large in amount of eroded portions as compared with other weldmetals, and hence are not suitable for use as cavitation-erosion resistant weldmetals.

EXAMPLE 2

In the same manner as in Example 1, 15 kinds of Cu-incorporated weldmetals are individually formed on a steel plate composed of 0.20 wt% of C, 0.35 wt% of Si, 0.50 wt% of Mn, 0.02 wt% of P, 0.016 wt% of S, and the balance of Fe. The compositions of the weldmetals were as shown in Table 4.

TABLE 4

| | Composition (wt%) | | | | | | |
|---|---|---|---|---|---|---|---|
| No. | C | Cr | Co | Cu | Si | Mn | Fe |
| 25 | 0.18 | 12.9 | 15.5 | 4.7 | 0.18 | 0.40 | Balance. |
| 26 | 0.21 | 14.1 | 11.2 | 5.4 | 0.20 | 0.36 | Do. |
| 27 | 0.15 | 15.8 | 6.0 | 0.8 | 0.27 | 0.66 | Do. |
| 28 | 0.25 | 16.1 | 5.2 | 3.6 | 0.21 | 0.36 | Do. |
| 29 | 0.16 | 16.7 | 8.9 | 0.3 | 0.25 | 0.45 | Do. |
| 30 | 0.10 | 17.3 | 2.0 | 5.8 | 0.20 | 1.52 | Do. |
| 31 | 0.22 | 16.1 | 5.2 | 1.1 | 0.33 | 0.65 | Do. |
| 32 | 0.28 | 17.6 | 5.7 | 3.0 | 0.39 | 0.98 | Do. |
| 33 | 0.24 | 17.4 | 2.5 | 8.3 | 0.25 | 0.37 | Do. |

According to Table 5, the weldmetal Nos. 27 and 29 are unexpectedly large in amount of eroded portions. If Cu is removed from the weldmetal No. 29, the composition of said weldmetal is substantially the same as that of the weldmetal No. 8. Accordingly, the amount of eroded portions of the weldmetal No. 29 ought to be far smaller than that of the weldmetal No. 8. Nevertheless, the amount of eroded portions of the weldmetal No. 29 is merely 0.2 mg/2 hr smaller than that of the weldmetal No. 8. This is ascribable to the fact that the amount of Cu is too small to display its effect. In view of its composition, the weld-metal No. 27 is considered to be comparable to a certain extent to the weldmetal No. 31. Nevertheless, the amount of eroded portions of the weldmetal No. 27 is far larger than that of the weldmetal No. 31. This is also ascribable to the amount of Cu. Considering the facts that the weld-metal No. 31, which had been incorporated with 1.1 wt% of Cu, showed favorable erosion resistance and that fine cracks were observed in the weldmetal No. 33, the amount of Cu to be incorporated into a weldmetal is preferably from 1 to 8 wt%.

Thus, it has been confirmed that a weldmetal comprising up to 0.5 wt% of C, 10 to 30 wt% of Cr, 0.5 to 30 wt% of Co, up to 1 wt% of Si, up to 3 wt% of Mn, and the balance of Fe and accompanying impurities is high in resistance to cavitation-erosion and forms no weld-cracks, and hence is best suitable for welding to surfaces of portions of a water turbine runner of which blades are liable to undergo cavitation-erosion.

FIG. 1 is a respective, partially broken away, view of a Francis type water turbine runner. In the runner, the blades 10 have been press-molded with a predetermined radius of curvature, and the material thereof is a steel containing about 13 wt% of chromium.

A cause for generation of cavitation is that the blades have a complex curved surface, and another cause therefor is that the cavitation is closely related with the surfaces of blades positioned at the down-flow side of the runner, i.e. with the side of handling 14. More particularly, the blades 10 have been so constructed that the angle of each blade to the direction of water flow becomes greater as the blade is extended to the side of band ring 12. Further, the Francis type water turbine runner is rotated due to the impact of water flow which is applied to the blades 10 and due to the difference in pressure between the up-flow side, which is chiefly formed on the side of band ring 12, and the down-flow side. Accordingly, it is inevitable that low pressure portions are formed on the down-flow side, and thus the cavitation is frequently generated in said low pressure portions. The portions, in which the cavitation is generated, are concretely represented by the portion A in FIG. 1.

In another embodiment of the present invention, a weldmetal comprising 0.24 wt% of C, 25.2 wt% of Cr, 24.8 wt% of Co, 0.19 wt% of Si, 0.36 wt% of Mn, and the balance of Fe was formed on the surfaces of portions of a 29,000 kw Francis type water turbine runner. Concretely, the said portions corresponded to the portion A in FIG. 1. The water turbine runner was made of SUS 50HP, was composed of 0.09 wt% of C, 0.25 wt% of Si, 0.35 wt% of Mn, 0.025 wt% of P, 0.006 wt% of S, 0.44 wt% of Ni, 11.71 wt% of Cr, and the balance of Fe, and had an average thickness of 50 mm. The welding was effected by the use of an alternating current welding machine, wherein the welding current was 130 to 150A, and both the preheating temperature and the temperature between strata were 150° to 200° C. The diameter of welding rod core wire, the composition of flux, and the diameter of welding rod were the same as those in Example 1.

At portions of the water turbine runner to which the welding was to be applied were previously formed recesses of 30 × 30 mm² in area and 5 mm in depth, and the aforesaid weldmetal was welded in said recesses and then cooled as it was to 150° C. Thereafter, the weldmetal was heated to 400° C and then cooled gradually. The welded portions were ground with a grinder so that the surfaces thereof were levelled with adjacent surfaces of the runner, and then finished with sandpaper.

It was considered that a water turbine runner could not be used if the depths of portions eroded due to cavitation-erosion or due to ordinary erosion became 20% of the thickness of the runner plate, and that the life of a conventional SUS 50HP-made water turbine runner was ordinarily 1 year. However, the life of a water turbine runner manufactured in the above-mentioned manner is 4 years and thus has been markedly prolonged.

While a preferred embodiment of the present invention has been explained in the above with respect to the case of Francis type water turbine runner, it is needless to say that the present invention is successfully applicable to the runner blades of Pelton type and Capran type water turbines.

In the case of Capran type water turbine runner, like in the case of Francis type water turbine runner, cavitation is generated on the sides opposite to the blade surfaces to which the power of water is applied, and the thus generated cavitation becomes a cause for erosion. Accordingly, the portions of Capran type water turbine runner which are to be subjected to welding are the same as in the case of Francis type water turbine runner.

In the case of Pelton type water turbine runner, the power of water is applied to the inner surfaces of buckets. If indented portions are formed on the inner surfaces of buckets due to gravel and sand accompanied with the water, the said portions become causes for bringing about cavitation-erosion. In the case of Pelton type water turbine runner, therefore, on the inner surfaces of buckets is formed the weldmetal.

We claim:

1. A water turbine runner comprising a plurality of blades coaxially fixed to one axis, said blades being composed of an iron-base material, wherein each blade is provided with a smooth-surface weld metal formed only on the surface at the position where erosion due to cavitation takes place, said weld metal consisting essentially of 0.1 to 0.5 wt.% of C, 10 to 30 wt.% of Cr, 0.5 to 30 wt.% of Co, an effective amount for effecting deoxidation up to 1 wt.% of Si, an effective amount for effecting deoxidation up to 3 wt.% of Mn and the balance of Fe.

2. The water turbine runner of claim 1, wherein said weld metal contains less than 0.03 wt.% of P and S as inevitable impurities.

3. The water turbine runner of claim 1, wherein said weld metal contains from 0.17 wt.% to 1 wt.% of Si.

4. The water turbine runner of claim 3, wherein said weld metal contains 0.35 wt.% to 3 wt.% of Mn.

5. The water turbine runner of claim 1, wherein said weld metal contains Cr and Co in a total amount less than 26 wt.%.

6. A Pelton type water turbine runner comprising a plurality of buckets coaxially fixed to one axis, the bucket being composed of an iron-base material, each of said buckets being provided with a smoothed-surface weld metal formed only on the surface at the position where high speed water collides therewith and erosion due to cavitation takes place, said weld metal consisting essentially of 0.1 to 0.5 wt.% of C, 10 to 30 wt.% of Cr, 0.5 to 30 wt.% of Co, an effective amount for effecting deoxidation up to 1 wt.% of Si; an effective amount for effecting deoxidation up to 3 wt.% of Mn and the balance of Fe.

7. A Capron or Francis type water turbine runner comprising a plurality of blades coaxially fixed to one axis, the blades being composed of an iron-base material, each blade to which the high speed water collides being provided with a smoothed-surface weld metal only on a part of the surface of the blade at which erosion due to cavitation takes place, said weld metal consisting essentially of 0.1 to 0.5 wt.% of C, 10 to 30 wt.% of Cr, 0.5 to 30 wt.% of Co, an effective amount for effecting deoxidation up to 1 wt.% of Si, an effective amount for effecting deoxidation up to 3 wt.% of Mn and the balance of Fe.

8. A water turbine runner comprising a plurality of blades coaxially fixed to one axis, the blade being composed of an iron-base material, each of said blades being provided with smoothed-surface weld metal only on a part where cavitation erosion takes place, said weld metal consisting essentially of 0.1 to 0.5 wt.% of C, 10 to 30 wt.% of Cr, 0.5 to 30 wt.% of Co, 1 to 8 wt.% of Cu., an effective amount for effecting deoxidation up to 1 wt.% of Si, an effective amount for effecting deoxidation up to 3 wt.% of Mn and the balance of Fe and accompanying impurities.

9. A water turbine runner comprising a plurality of blades coaxially fixed to one axis, the blades being composed of an iron-base material, each of said blades being provided with smoothed-surface weld metal on a part of surface where cavitation-erosion takes place, said weld metal having a thickness of 3 to 7 mm. and consisting essentially of 0.1 to 0.5 wt.% of C, 10 to 30 wt.% of Cr, 0.5 to 30 wt.% of Co, an effective amount for effecting deoxidation up to 1 wt.% of Si, an effective amount for effecting deoxidation up to 3 wt.% of Mn, and the balance of Fe and accompanying impurities.

10. A water turbine runner comprising a plurality of blades coaxially fixed to one axis, the blades being composed of a steel containing 11 to 14 wt.% of chromium, each of said blades being provided with a weld metal on an only part of surface where cavitation-erosion takes place, said weld metal consisting essentially of 0.1 to 0.5 wt.% of C, 10 to 30 wt.% of Cr, 0.5 to 30 wt.% of Co, an effective amount for effecting deoxidation up to 1 wt.% of Si, an effective amount for effecting deoxidation up to 3 wt.% of Mn; and the balance of Fe and accompanying impurities.

11. The water turbine runner of claim 10, wherein said weld metal has a thickness of 3 to 7 mm.

12. A water turbine runner comprising a plurality of blades coaxially fixed to one axis, said blades being composed of an iron-base material, wherein each blade is provided with a smooth-surface weld metal formed only on the surface at the position where erosion due to cavitation takes place, said weld metal consisting of 0.1 to 0.5 wt.% of C, 10 to 30 wt.% of Cr, 0.5 to 30 wt.% of Co, an effective amount for effecting deoxidation up to 1 wt.% of Si, an effective amount for effecting deoxidation up to 3 wt.% of Mn and the balance of Fe and inevitable impurities.

13. The water turbine runner of claim 12, wherein said weld metal contains less than 0.03 wt.% of P and S as inevitable impurities.

14. The water turbine runner of claim 12, wherein said weld metal contains from 0.17 wt.% to 1 wt.% of Si.

15. The water turbine runner of claim 14, wherein the weld metal contains from 0.35 wt.% to 3 wt.% of Mn.

16. The water turbine runner of claim 12, wherein the weld metal contains Cr and Co in a total amount less than 26 wt.%

17. A water turbine runner comprising a plurality of blades coaxially fixed to one axis, the blade being composed of an iron-base material, each of said blades being provided with smoothed-surface weld metal only on a part where cavitation erosion takes place, said weld metal consisting of 0.1 to 0.5 wt.% of C, 10 to 30 wt.% of Cr, 0.5 to 30 wt.% of Co, 1 to 8 wt.% of Cu, an effective amount for effecting deoxidation up to 1 wt.% of Si, an effective amount for effecting deoxidation up to 3 wt.% of Mn, and the balance of Fe and accompanying impurities.

18. The water turbine runner of claim 17, wherein said weld metal contains less than 0.03 wt.% of P and S as accompanying impurities.

19. The water turbine runner of claim 17, wherein the weld metal contains from 0.17 wt.% to 1 wt.% of Si.

20. The water turbine runner of claim 19, wherein the weld metal contains from 0.35 wt.% to 3 wt.% of Mn.

21. The water turbine runner of claim 17, wherein said weld metal contains Cr and Co in a total amount less than 26 wt.%.

* * * * *